United States Patent [19]
Finefrock

[11] 3,826,547
[45] July 30, 1974

[54] WATER LUBRICATED RUBBER BEARING
[75] Inventor: Donald W. Finefrock, Burton, Ohio
[73] Assignee: The Johnson Rubber Company, Middlefield, Ohio
[22] Filed: Apr. 27, 1973
[21] Appl. No.: 355,206

[52] U.S. Cl. .............................................. 308/238
[51] Int. Cl. .......................................... F16c 27/02
[58] Field of Search.......................... 308/238, 26, 4

[56] References Cited
UNITED STATES PATENTS
1,885,339   11/1932   Evans................................ 308/238

Primary Examiner—Charles J. Myhre
Assistant Examiner—Frank Susko
Attorney, Agent, or Firm—McNenny, Farrington, Pearne & Gordon

[57] ABSTRACT

A water lubricated bearing is disclosed providing a housing formed with a cylindrical bore in which a plurality of symmetrically spaced keys are mounted. A compliment of staves formed entirely of elastomeric material are positioned in the bore and directly compressed by a removable compression head to cause tight engagement between the bore and keys. Removal of the compression head allows the staves to assume their unstressed condition in which clearance is provided with respect to both the bore and the keyways.

7 Claims, 3 Drawing Figures

PATENTED JUL 30 1974  3,826,547

WATER LUBRICATED RUBBER BEARING

BACKGROUND OF THE INVENTION

This invention relates generally to water lubricated bearings or the like and more particularly to such a bearing with novel and improved means for releasably locking staves in a bearing housing.

PRIOR ART

In the U.S. Pats., Nos. 3,407,779 and 3,606,505 (both assigned to the assignee of the present invention), a bearing system is disclosed in which a compliment of rubber staves is releasably locked in a housing provided with a smooth cylindrical stave retaining bore. The staves cooperate to provide a mating cylindrical surface and releasable clamping means cause radial compressive forces between such cylindrical surfaces for locking the staves in position. When the clamping means are released, the staves are unstressed and clearance exists to allow removal and replacement of the staves. In such a bearing, the entire locking of the staves is provided by the compressive forces between the inner cylindrical surface of the housing and the mating outer cylindrical surface of the compliment of staves.

In other bearing systems, for example as illustrated in the U.S. Pats., Nos. 1,895,936; 1,919,375; 2,256,647; 2,310,053; 2,372,054; 2,381,249, and 2,381,270, various structural arrangements are provided to releasably lock staves in bearing housings. In some of these systems, keepers are provided at spaced locations around the housing and a plurality or array of staves is positioned and retained between adjacent keepers. In such system, the separate arrays cooperate to form a full compliment of staves which encircle and support a shaft.

SUMMARY OF THE INVENTION

In the illustrated embodiment of the present invention, a bearing housing is provided with a cylindrical bore and four rectangular keys are mounted with screws in the bore. The keys are equally spaced around the bore and extend parallel to the axis thereof. A compliment of staves formed entirely of elastomeric material is positioned in the bore with each stave cooperating with the rest to fully encircle the shaft. Four of the staves are formed with keyways which receive the associated keys. The staves and housing are proportioned so that the full compliment of staves, when they are in their unstressed condition, fit into the housing with clearance, both with respect to the housing and the keys.

A compression head is removably mounted on the end of the housing and operates, when installed, to axially compress the staves causing them to increase in lateral section until they tightly engage both the inner cylindrical wall of the housing and the keys mounted thereon.

The radial compressive forces between the cylindrical walls and the outer surfaces of the staves produce a locking of the staves which cooperates with the interengagement between the keys and keyways to securely lock the staves in position within the housing.

Because the staves are formed entirely of elastomeric material, the compressive forces tend to be equally distributed over the entire area of mating arrangement between the staves and the housing. Further, because the rubber of the staves extends past the keys, the compliment of staves acts as a single unit which is compressed with a single compression head for substantially equal locking of all of the staves. Still further, the structure in which the staves extend over the keys prevents the lubricant, normally water, from reaching the interface between the stave and the mating surface of the housing and keys to insure that a maximum locking friction is obtained between each stave and the mating surface of the housing assembly.

With the invention, a simple structure is provided to allow the releasable locking of the staves of a water lubricated rubber bearing or the like in a bearing housing in a manner which insures that the staves are positively locked in position against movement with respect to the housing.

DETAILED DESCRIPTION OF THE DRAWINGS

Figure 3:
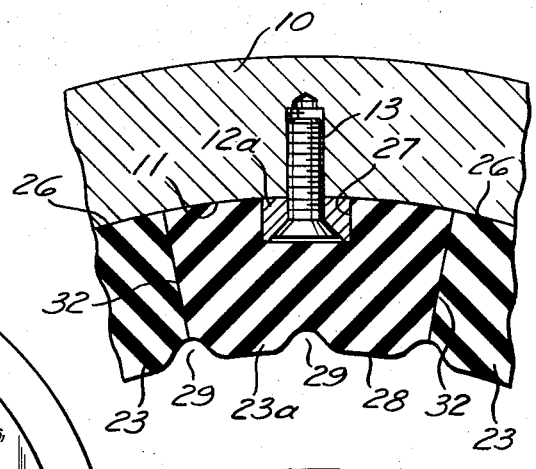
FIG. 3 is an enlarged fragmentary section taken along 3—3 of FIG. 1.

In the illustrated embodiment of this invention, a housing assembly includes a main tubular housing 10 formed with a cylindrical bore 11 extending therethrough. Four rectangular keys 12a, 12b, 12c, and 12d are secured to the bore by screws 13. The keys are positioned symmetrically around the bore and extend parallel to the axis 14 thereof. As best illustrated in FIG. 3, the keyways are radiused along their outer side to snugly fit against the wall of the bore 11, and the screws are countersunk so that the heads are substantially flush with the inner surface of the key. Fixed to one end of the housing 10, is a plate 14 provided with an axially extending flange 16 extending into the bore 11 with a close fit and terminating at an end wall 17. The flange 16 is proportioned to provide clearance with the adjacent ends of the keys 12a to 12d. The end wall 17 provides a shoulder against which the staves seat in a manner discussed in greater detail below. The plate 14 is mounted on the housing 10 by any suitable means (not illustrated) and need not be removable with respect to the housing.

Figure 2:
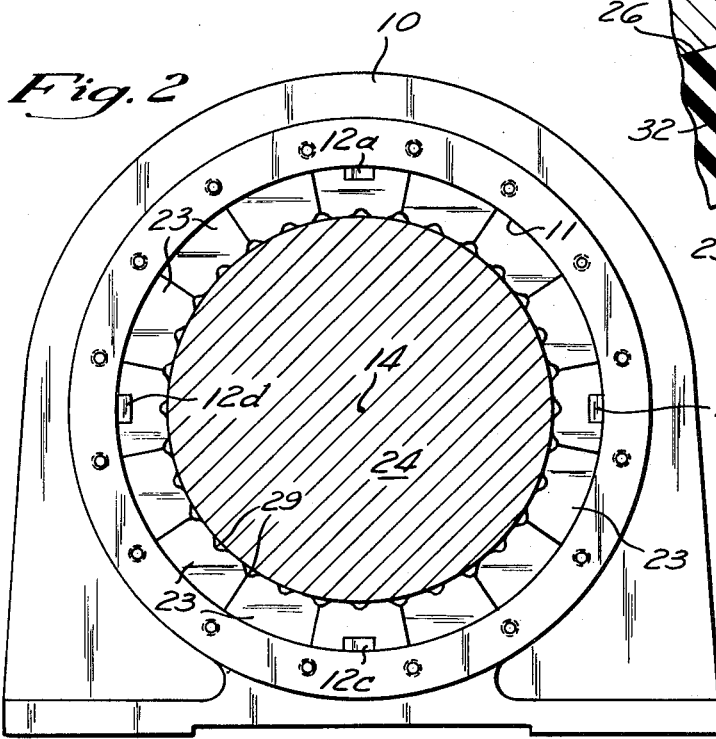
FIG. 2 is an end view of the bearing illustrated in FIG. 1 with the compression head removed.

A compression head 18 is removably bolted to the opposite end of the housing by bolts 19. The compression head 18 is formed with an axially extending flange 21 which extends in along the bore 11 to an end face at 22. Here again, clearance is provided between the end face 22 and the keys. A plurality of staves 23 formed entirely of elastomeric material are positioned within the housing as best illustrated in FIGS. 2 and 3. In the illustrated embodiment, there are 16 staves in the full compliment of staves which cooperate to encircle a rotating shaft 24 which is supported and journaled by the bearing staves.

Most of the staves 23 are formed with a smoothly curved outer surface 26 which mates with and firmly engages the bore 11. Four of the staves 23a differ from the remaining staves in that they are each formed with a keyway 27 in their outer surface to receive the associated key 12a through 12d. In the illustrated embodiment, the keys 12a through 12d are positioned in the center of an associated stave and the stave cooperates with the housing to completely enclose the associated key. However, in some instances it may be desirable to locate the keys and keyways at a joint between two adjacent staves with part of the keyway formed in each of such adjacent staves. In either arrangement, however, the staves should be arranged to extend radially inward from the keys so that the keys are totally enclosed by the stave material.

The inner surface 28 of the staves cooperate to form a cylindrical bearing surface which supports the shaft 24. Water grooves of the usual type are provided to wet the surface of the shaft 24 as it rotates and thus provide lubrication for the bearing. The bearing in accordance with the present invention may be used in a variety of installations. For example, the bearing may be used in the propulsion system of a marine vessel or the like as illustrated in some of the patents referred to above or may be used to support the impeller of a pump as disclosed in the copending application of John Glenn Satterthwaite, Ser. No. 117,334, filed Sept. 2, 1971. In such a pump installation, glands of suitable type may be provided in the compression head 18 and/or the plate 14. In such installations, lubricant water under pressure is usually supplied to the bearing.

Figure 1:
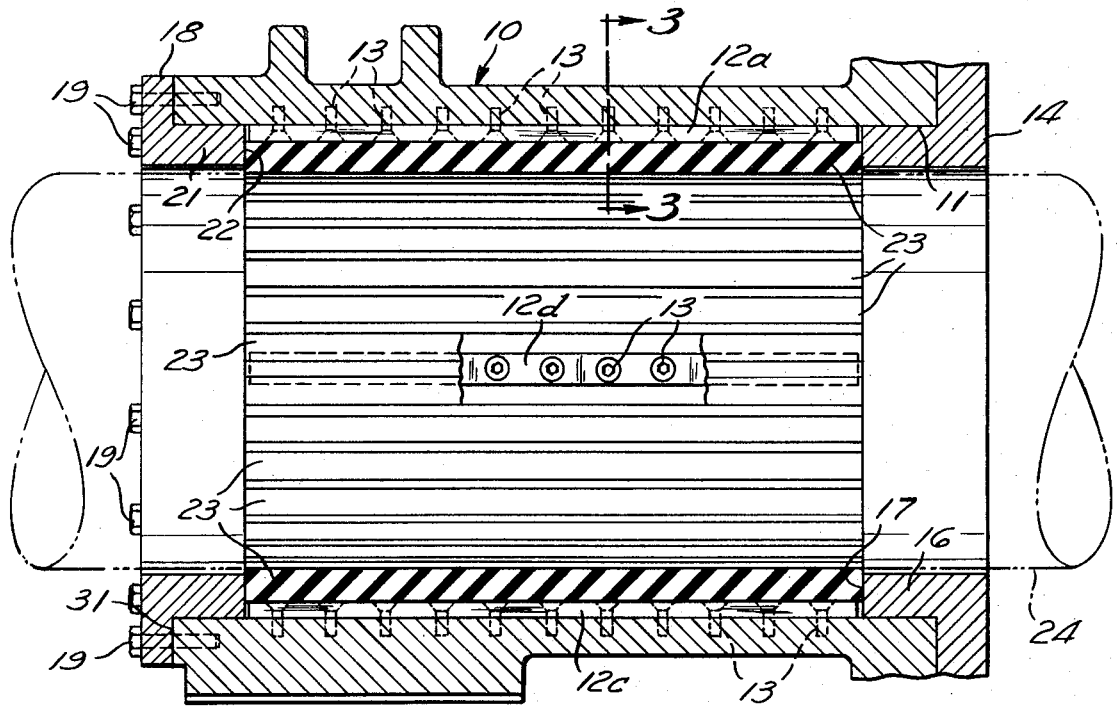
FIG. 1 is a side elevation in longitudinal section of a bearing incorporating the present invention in which the shaft is shown in phantom so as to better illustrate the bearing structure.

The staves 23 and 23a are preferably formed so that when they are unstressed, they fit into the housing with clearance and fit over the keys 12a through 12d with clearance. In their unstressed condition, the staves 23 are formed with a length exceeding the length illustrated in FIG. 1 and can, for example, extend almost to the end 31 of the housing. In order to lock the stave in position within the housing, the compression head 18 is drawn by the bolts 19 into its mounted position causing the staves to be axially shortened from their unstressed condition. The axial compression of the staves causes the staves to expand laterally in all directions and causes the clearance to be taken up. The various elements are proportioned so that when the compression head is stopped or seated against the end face 31, the staves are axially shortened a sufficient amount to cause the staves to tightly engage the bore 11 with sufficient force to lock the staves against relative movement with respect to the surface. The staves also tightly engage along their side edges 32, and the clearance is taken up around the keys so that the keyways tightly engage the keys.

In the mounted condition, a substantial portion of the locking of the staves is created by the interengagement between the surfaces 26 and the bore 11, but the keys and keyways also cooperate to resist any relative rotation between the compliment of staves and the housing. Because the staves are formed entirely of elastomeric material and because they extend past the keys, the full compliment of staves is clamped and locked in place in a substantially uniform manner. Slight misalignments between the keys and keyways do not present a problem because of the elastomeric nature of the staves and a unitary assembly is achieved.

It is recognized that the bearing surfaces 28 move radially inward to some extent during the axial compression of the staves due to the radial thickening of the staves. Here again, the various elements are proportioned so that clearance (not illustrated) is provided between the surfaces 28 and the outer surface of the shaft 24 to insure that the shaft does not seize, and that proper lubrication is achieved as the shaft rotates.

Because the keyways are totally enclosed and because a tight engagement is maintained between the surfaces of the staves and the housing bore, the penetration of lubricant into the area mating engagement between the housing assembly and the staves does not occur. This is important since the presence of lubricant at the interface between the staves and the housing assembly could tend to produce a reduction in the frictional engagement and tend to reduce the locking forces which are required to prevent rotation of the staves with the shaft.

With the present invention, a simple expedience of removing the compression head 18 allows the staves to assume their unstressed condition so that they can be removed and replaced as needed. After replacement of the staves, replacement of the compression head completes the reassembly of the bearing.

Although a preferred embodiment of this invention is illustrated, it should be understood that various modifications and rearrangements of parts may be resorted to without departing from the scope of the invention disclosed and claimed herein.

What is claimed is:

1. An elastomeric bearing for a rotatable shaft comprising housing means providing a cylindrical bore adapted to be positioned around said shaft, a plurality of segmental bearing staves formed entirely of elastomeric material and providing an inner bearing surface of elastomeric material adapted to provide bearing contact with the surface of said shaft and cooperate with the bearing surface of the other of said staves to form a tubular bearing having a bearing axis, the exterior of said staves cooperating to define a cylindrical surface around said axis engaging substantially throughout its entire extent with a mating inner surface on said housing means, said staves and housing means providing a mating key and keyway extending substantially parallel to said bearing axis with the staves extending past said key and keyway, said staves, housing means, and key and keyway being proportioned to provide clearance when said staves are unstressed, said housing means including clamping means releasably producing pressure between said mating inner surface of said housing and the exterior surface of said staves and causing said key and keyway to engage without clearance, said pressure between said mating inner surface of said housing and said exterior surface of said stave cooperating with said key and keyway to provide the entire locking of said staves in said housing means, and stop means opposing said clamping means when said staves are in a predetermined position and accurately determining the position of said inner bearing surface of all of said staves, release of said clamping means permitting axial movement of said staves relative to said housing assembly.

2. An elastomeric bearing as set forth in claim 1 wherein said housing means provides said key and said keyway is provided in the outer surface of said compliment of staves.

3. An elastomeric bearing as set forth in claim 2 wherein a plurality of similar keys and keyways are provided at symmetrically spaced locations around said bore.

4. An elastomeric bearing as set forth in claim 3 wherein said keys are bolted to said cylindrical bore.

5. An elastomeric bearing as set forth in claim 4 wherein each of said keyways is formed substantially along the center of the exterior surface of said staves.

6. An elastomeric bearing as set forth in claim 1 wherein a plurality of similar keys and keyways are provided at symmetrically spaced locations around said bore.

7. An elastomeric bearing as set forth in claim 6 wherein each of said keyways is positioned substantially along the center of the exterior surface of said staves.

* * * * *